United States Patent
Perrin et al.

(10) Patent No.: US 8,418,866 B2
(45) Date of Patent: *Apr. 16, 2013

(54) STOPPER WITH AN OBSTRUCTOR FOR A CAN AND METHOD FOR THE PRODUCTION OF SAID STOPPER

(75) Inventors: Gérard Perrin, Meyzieu (FR); Henri Pionchon, Lyons (FR)

(73) Assignee: Tetra Laval Holdings & Finance S.A., Pully (CH)

( * ) Notice: Subject to any disclaimer, the term of this patent is extended or adjusted under 35 U.S.C. 154(b) by 50 days.

This patent is subject to a terminal disclaimer.

(21) Appl. No.: 13/154,160

(22) Filed: Jun. 6, 2011

(65) Prior Publication Data
US 2011/0266312 A1 Nov. 3, 2011

Related U.S. Application Data

(62) Division of application No. 10/545,016, filed as application No. PCT/CA03/01026 on Jul. 8, 2003, now Pat. No. 8,016,143.

(30) Foreign Application Priority Data

Feb. 11, 2003 (CA) ...................................... 2418456

(51) Int. Cl.
*B65D 41/48* (2006.01)
*B65D 53/00* (2006.01)
(52) U.S. Cl.
USPC ........................................ 215/253; 220/254.9
(58) Field of Classification Search .................. 215/253; 220/254.1, 254.9
See application file for complete search history.

(56) References Cited

U.S. PATENT DOCUMENTS

| 5,121,778 | A | 6/1992 | Baker et al. |
| 5,222,530 | A | 6/1993 | Baker et al. |
| 5,392,939 | A | 2/1995 | Hidding et al. |
| 5,909,827 | A | 6/1999 | Bietzer et al. |
| 5,957,316 | A | 9/1999 | Hidding et al. |
| 6,177,041 | B1 | 1/2001 | Bietzer et al. |
| 8,016,143 | B2 | 9/2011 | Perrin et al. |
| 2006/0201905 | A1 | 9/2006 | Perrin et al. |

FOREIGN PATENT DOCUMENTS

| CA | 2418456 | 2/2003 |
| EP | 0641713 B1 | 6/1989 |
| EP | 1594794 B1 | 8/2003 |
| FR | 2822810 A1 | 10/2002 |
| WO | WO 02/060808 A1 | 8/2002 |

*Primary Examiner* — Anthony Stashick
*Assistant Examiner* — James N Smalley
(74) *Attorney, Agent, or Firm* — Finnegan, Henderson, Farabow, Garrett & Dunner, LLP (57) ABSTRACT

The invention relates to a stopper, provided with an obstructor for a can. Said stopper comprises a cap provided with a central opening and an annular skirt, and an annular shaft extending around the opening, in addition to a capsule which is detachably fixed, by means of a tear element, to a free edge of the shaft opposite the opening. The tear element joining the shaft to the capsule is placed in an entrance area at an angle in the free edge of the shaft. At least one sealing lip is disposed on the inner surface of the shaft, and the cap, skirt and capsule of the stopper are moulded in a single piece without any welding or the addition of another component or detachable part. The invention also relates to a method for the production of said stopper by offset injection in a region which is outside the cap.

4 Claims, 14 Drawing Sheets

STOPPER WITH AN OBSTRUCTOR FOR A CAN AND METHOD FOR THE PRODUCTION OF SAID STOPPER

CROSS-REFERENCE TO RELATED APPLICATIONS

This is a divisional application of U.S. Ser. No. 10/545,016 filed Apr. 16, 2006, now U.S. Pat. No. 8,016,143 which is a US national stage of International Application No. PCT/CA2003/001026 filed Jul. 8, 2003, which claims priority under the Paris Convention to Canadian Application No. 2418456 filed Feb. 11, 2003.

FIELD OF THE INVENTION

The present invention relates to an obturation cap especially adapted for use to close the neck of water containers, usually of three or five gallons, that are intended to be used in upside down position in water dispensing machines, also known as "water dispensers".

The invention also relates to a method for manufacturing this obturation cap by a single injection of plastic material in a mold especially devised for this purpose.

TECHNOLOGICAL BACKGROUND

Obturation caps of the above mentioned types have already been disclosed. In this connection, reference can be made to U.S. Pat. No. 5,222,530 of 1993 and to its European counterpart EP-0,641,713-B1 of 1997, both issued in the name of ELKAY MANUFACTURING CO. with designation of Henry E. BAKER et al as inventors.

Obturation caps of this type are extremely interesting but are presently difficult to manufacture in one single injection, without having to proceed to an ultrasonic welding or another type of welding. In this connection, reference can be made to the comments made in the preamble of U.S. Pat. No. 5,392,939 of 1995 in the name of Walter E. HIDDING et al where, in column 2, lines 3 to 20, mention is made to the problem of molding the cap disclosed in U.S. Pat. No. 5,121,778 of 1992 to ELKAY MANUFACTURING CO. which derives from the same parent application as U.S. Pat. No. 5,222,530 mentioned hereinabove and where, in the same column, mention is also made to the fact that it is impossible to manufacture such a cap by injection in one single piece.

International patent application No. WO 02/060808 A1 published in 2002 in the name of W. KRASKA discloses an obturation cap of the same type as mentioned hereinabove, as well as a method for manufacturing this cap by injection in one single piece. However, the potential problem with the method proposed in this international patent application is that one cannot necessarily obtain all the requested angulations and a consistence of the frangible connection. Once cannot also obtain necessarily all the requested curves to ensure that the sleeve of the cap be provided with one or more internal sealing tongues and the upper edge of this sleeve be inclined or bevelled to facilitate engagement of the plug within the sleeve during extraction of the liquid dispenser. However, these structural characteristics are actually essential when one wants to obtain a cap that is water tight and air tight and thus perfectly hygienic, in addition of having it also with tamper proof properties.

SUMMARY OF THE INVENTION

Therefore, a first object of the present invention is to provide an improved obturation cap, of the type comprising:

a lid provided with a central opening;
an annular skirt extending in a given direction all around an external periphery of the lid, said skirt being provided with a central axis and being devised and sized to be connected to the neck of the container;
an annular sleeve extending all around the central opening of the lid in the same direction as the skirt and coaxially therewith, the central opening and the sleeve surrounding the same being both sized to receive and guide the feed tube of the liquid dispenser used with the container closed by the cap; and
a plug fixed in a detachable manner by means of a frangible connection to a free edge of the sleeve opposite to the central opening, said plug being coaxial to the sleeve and devised to be separated from the same when the container closed by the cap is inserted into the liquid dispenser, said plug being also provided with internal gripping means for fixing it temporarily to an upper end of the feed tube during water flow, and with external sealing means for closing the sleeve when the container is removed from the liquid dispenser, the plug being then pulled back to the sleeve and forced into the same by the feed tube while the same is extracted from the sleeve.

In accordance with the invention, this obturation cap is improved in that:

the frangible connection between the sleeve and the plug is located in an angularly oriented inlet zone made in the free edge of the sleeve for, on one hand, facilitating tearing of the frangible connection during insertion of the cap onto the feed tube of the liquid dispenser and, on the other hand, facilitating engagement of the plug within the sleeve during extraction of the feed tube, the plug then acting as an obturator;
at least one sealing tongue is located on the inner surface of the sleeve to improve sealing of the cap and ensure a prealignment of the plug within the sleeve during extraction of the feed tube; and
the lid, the skirt, the sleeve and the plug of the cap are molded in one piece, without welding or adjunction of additional component or removable piece.

Another object of the invention is to provide a method for manufacturing this cap.

Both of these objects and their advantages will be better understood upon reading the non-restricting description that follows of a preferred embodiment of the invention, made with reference to the accompanying drawings.

BRIEF DESCRIPTION OF THE DRAWINGS

FIGS. 8 to 15 are cross-sectional views of a portion of the mold used for manufacturing the cap shown in the previous figures, showing the different phases and manufacturing steps.

DESCRIPTION OF A PREFERRED EMBODIMENT OF THE INVENTION

The obturation cap 1 according to the preferred embodiment of the invention as shown in the accompanying drawings is intended to be used for closing the neck of a water container devised for insertion in a water dispenser of the type disclosed in U.S. Pat. No. 5,222,530 mentioned hereinabove.

This cap comprises a round-shaped lid 3, which is provided with a central opening 5 which is also round-shaped.

An annular skirt 7 extends in a given direction all around the external periphery of the lid 3. This skirt 7 is provided with a central axis A and is devised and sized to be connected to the neck of the container. The way this connection can be made is quite standard and needs not be described in greater details.

In fact, the only information of interest is that, as is of common practice, the skirt is advantageously provided with a pulling tab 9 associated to a frangible line made in the internal surface of the skirt to allow tearing of it and thus to facilitate removal of the cap from the neck of the container once the same is empty.

In addition, the internal surface of the lid and the internal surface of the skirt may be provided with rims 13 and 15. The rim 13 positioned on the internal surface of the cap is coaxial to the opening 5 and is intended to be used to provide homogeneous filling of the mold cavity used for the manufacture of the cap during the injection phase, as will be explained hereinafter. The rim(s) 15 provided on the internal surface of the skirt is (are) intended to improve water tightness and air tightness of the cap and thus to, improve the hygienic properties of the container.

Figure 1:
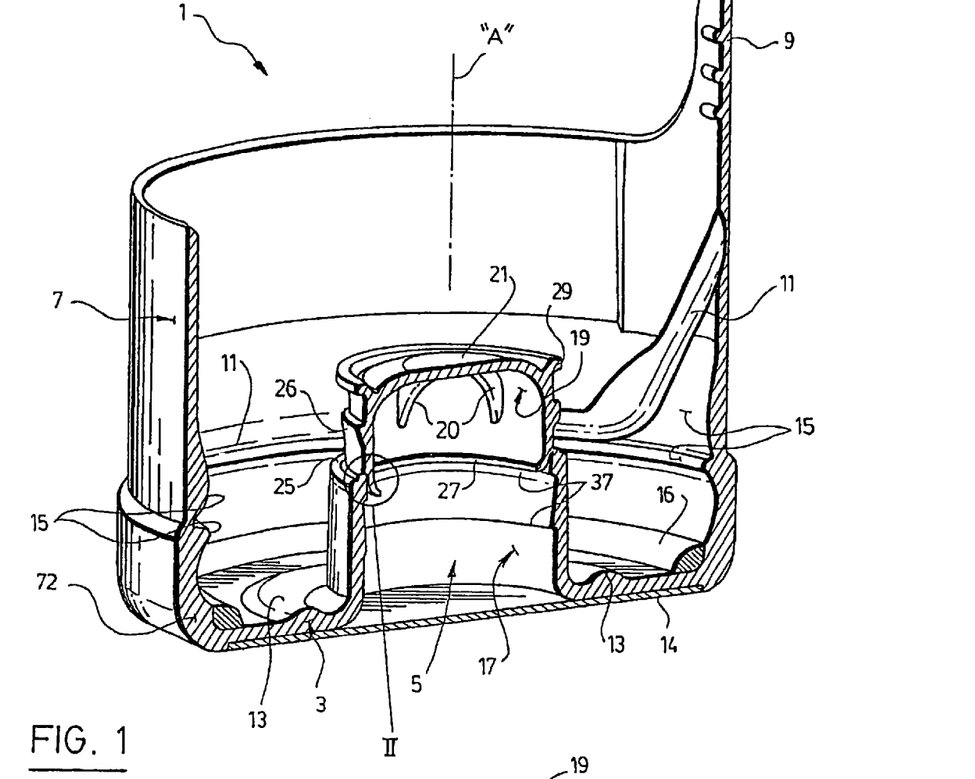
FIG. 1 is a cross-sectional perspective view of an obturation cap according to a preferred embodiment of the invention.

To guarantee this tightness, an annular sealing joint 16 may be used at a suitable location, preferably at an internal junction between the lid and the skirt, as is shown in FIG. 1. This joint 16 is advantageously made of food resin and manufactured by injection, in order to provide organoleptic properties protection and guarantee water purity within the container.

The external surface of the cap may also be provided with a central zone forming a recess of about 0.5 mm to allow positioning of an irremovable seal 14 (see FIG. 1) whose purpose is:

- to ensure protection against introduction of foreign elements within the sleeve via the central opening 5, especially during storing and transportation of the containers;
- to provide a first level tamper-proof guarantee (the second level is when the frangible connection of the plug is torn away, as will be explained hereinafter); and
- to allow easily readable identification by the consumer, of the water source that is used and of the identity of the company which has manufactured the container or filled it up.

Preferably, the seal 14 is welded instead of being glued, in order to avoid use of a glue that could be not alimentary, and also to exclude the risk of undesired sticking on the container after removal of the seal, thereby facilitating the task of the bottling industry while reducing the cleaning cost when returnable containers are sent back to the bottler.

The cap 1 also comprises a sleeve 17 in the form of an annular body extending all around the central opening 5 of the lid in the same direction as the skirt 7 and coaxially with it. In practice, the central opening 5 and the sleeve 17 surrounding the same are both sized to receive and guide the feed tube of the liquid dispenser on which the container closed by the cap is intended to be used (see FIGS. 4 to 7).

A plug 19 having an upper and 21 that is fully closed, is fixed in a detachable manner by means of a frangible connection 23 to the free edge 25 of the sleeve 17. The plug which acts as an "obturator", is coaxial to the sleeve 17 and devised to be separated from the same when the container closed by the cap is intended onto the feed tube of the liquid dispenser (see FIG. 6).

Figure 4:
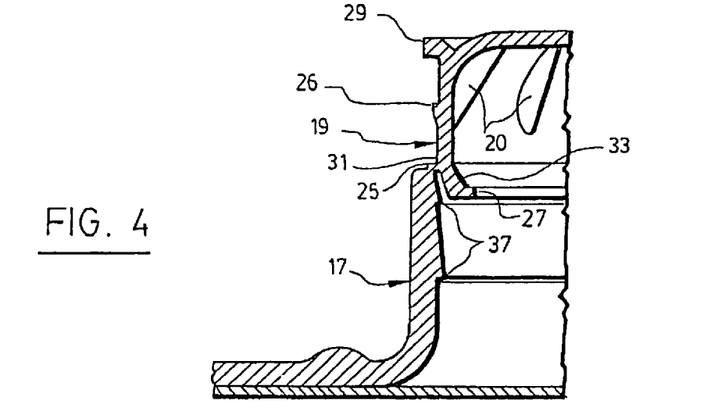
FIG. 4 is an enlarged cross-sectional view of the left hand-side of the sleeve and the plug of the cap shown in FIG. 3.
Figure 7:
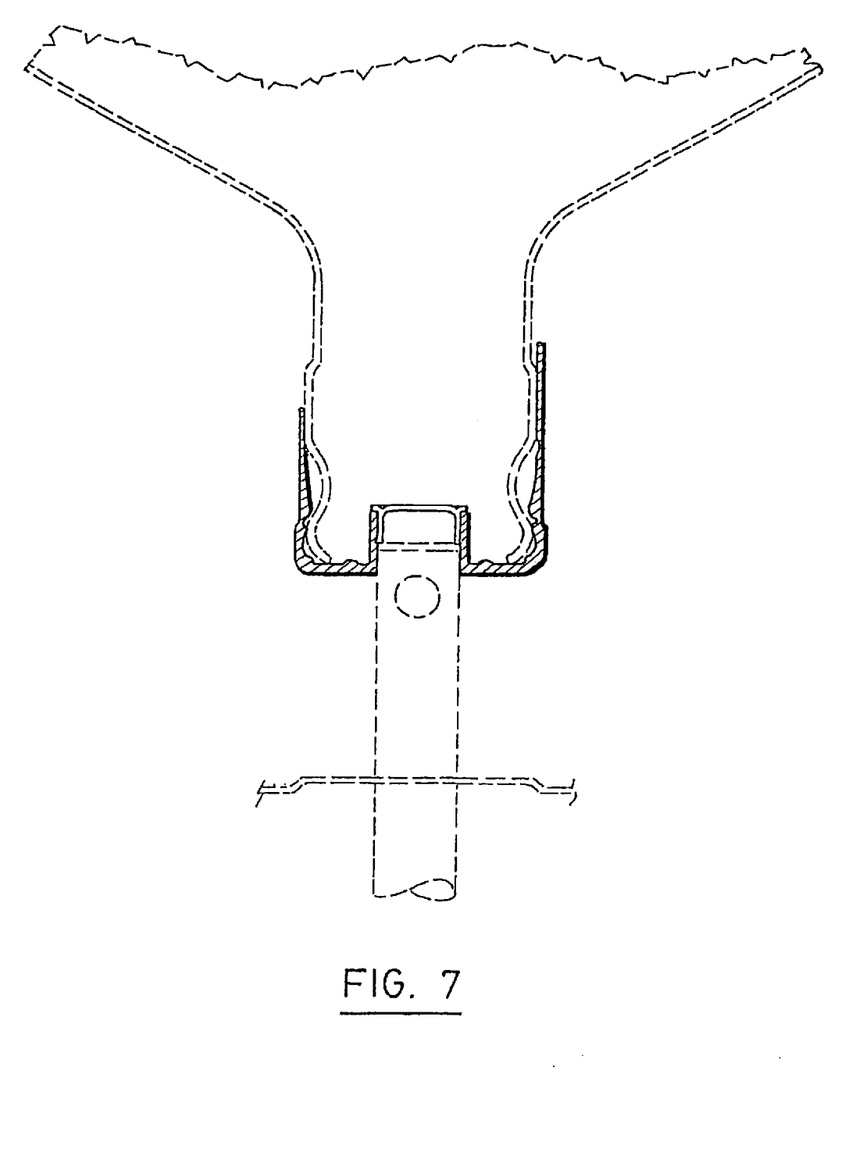
FIG. 7 is a view similar to FIGS. 5 and 6, showing the way the plug is forced back by the feed tube within the sleeve of the cap when the container is removed from the water dispenser.

As shown, the plug 19 is provided with internal gripping means 27 that preferably consists of a holding clip projecting radially within the plug in order to engage an annular slot provided near the upper end of the feed tube, as is shown in FIGS. 4 and 7.

The plug 19 is also provided with wings 20 intended to provide a proper centering of the same onto the upper end of the fed tube in use.

The plug 19 is further provided with external sealing means 29 to close the sleeve 17 when the container is removed from the dispenser and the plug is moved to the back to the sleeve and force within the same by the feed tube. These external sealing means 29 preferably consist of an external annular rim adjacent to the upper closed end 21 of the plug 19, which acts as a stop during extraction of the container (see FIG. 7) while coming into contact onto the free edge 25 of the sleeve.

Figure 5:
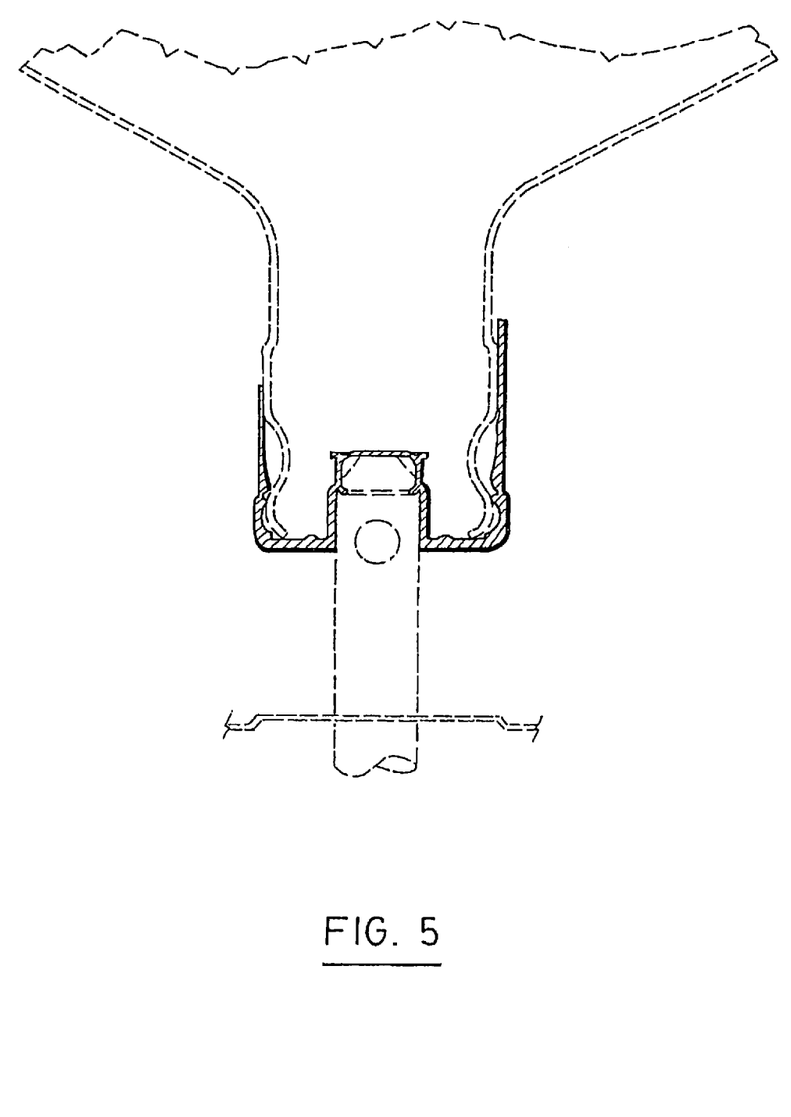
FIG. 5 is a schematic cross-sectional view of the neck of a container provided with the cap shown in FIG. 1, during installation within a water dispenser just before tearing of the frangible connection.
Figure 6:
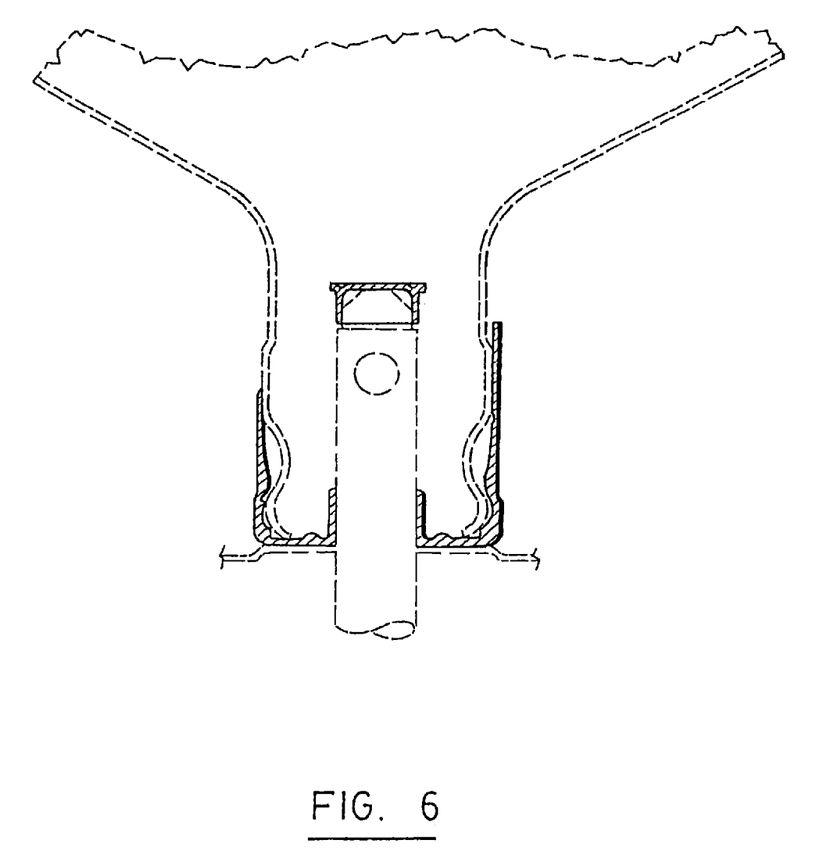
FIG. 6 is a view similar to FIG. 5, showing the container and its cap once installed within the water dispenser.

The way the obturation cap 1 as previously disclosed works is similar to what is disclosed in the prior art references mentioned hereinabove. In this connection, one may refer to FIGS. 5 to 7 which illustrate the operation of the cap when a container closed by the same is inserted into a liquid dispenser. FIG. 5 illustrates the cap during the insertion step. FIG. 6 illustrates the cap once the container has been inserted. FIG. 7 illustrates the way the plug is forced into the sleeve to close the cap in a tight manner when the container is removed from the dispenser.

As previously mentioned, a first characteristic of the invention, that distinguishes it over the prior art, is that the frangible connection 23 between the sleeve 17 and the plug 19 is located in an angularly oriented inlet zone made in the free edge 25 of the sleeve for, on the one hand, facilitating tearing of the frangible connection during insertion of the cap onto the feed tube of the liquid dispenser and, on the other hand, facilitating engagement of the plug within the sleeve during extraction of the feed tube.

Figure 2:
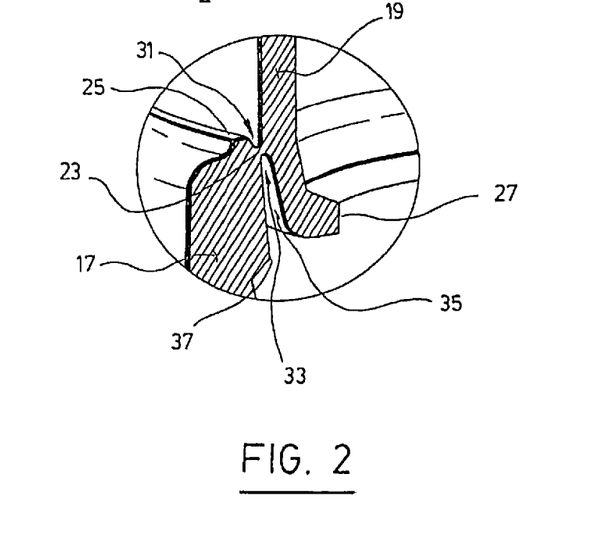
FIG. 2 is a cross-sectional enlarged view of part II of FIG. 1.

More precisely, as is shown in FIGS. 2 and 4, the frangible connection 23 is located in an inlet zone having a short portion 31 located above the frangible connection, with an inwardly oriented inclination angle ranging from 20 to 60°, and preferably equal to about 45°, and a longer portion 33 located below the frangible connection, with an inwardly oriented inclination angle ranging from 5 to 20°, and preferably equal to about 5°. It is worth noting that these angles could slightly vary, the only real requirement being that the inclination angle of the portion above the portion 31 of the zone 31 above the frangible connection be larger than the other so as to facilitate insertion of the plug within the sleeve during extraction from the feed tube.

To facilitate this engagement of the plug within the sleeve, the lower edge 35 of the plug 23 below the frangible connection where radially extend the annular rim 27 acting as internal gripping means, can also be inclined internally (see FIG. 2).

A second important characteristic of the invention is that the sleeve 17 is molded with one or more sealing tongues 37 located on its inner surface.

The advantage of these sealing tongues 37 is that, while providing tightness of the sleeve during installation and removal of the plug to and from the sleeve, they also facilitate their assembly by ensuring prealignment of the plug within the sleeve.

The difference in diameter produced by the angulations of the sealing tongues 37 as shown in the drawings also has the advantage of ensuring prealignment of the plug within the sleeve during extraction of the container closed by the cap, as is shown in FIG. 7.

A further advantage of these tongues is that at least one of them, preferably the one which is the closest to the free edge of the sleeve 17, may act as a clip for holding the caps in order to provide external tightness when the container is removed. The external peripheral part of the plug 19 may also be provided with an external tongue 26 cooperating with the "upper" tongue 37 to retain the plug when the container is reinserted within the liquid dispenser.

Last of all, as mentioned hereinabove, a third important characteristic of the invention is that the whole cap 1 previously disclosed, including its lid 3, its skirt 7, its sleeve 17 and its plug 19 and all the other elements that are parts of them, such as the rims 13, the sealing tongues 37, the sealing rings 15 and others, is molded in one single piece, without having to proceed to welding, glueing or other adjunction of additional components or removable pieces as it is done in the prior art.

The fact that the cap is molded in one single piece, is important since such permits to avoid contamination that may occur when the cap is made of two or more pieces that must be stocked and handled before being assembled.

The molding in one piece is also important inasmuch as it permits to give to the cap any desired color, which is impossible when the cap is made of several pieces of plastic material that must be assembled by welding or any other means.

Accordingly, the cap 1 according to the invention as disclosed hereinabove is very interesting inasmuch as it is made of one single piece of very "performant" structure.

Like the other caps of the same type disclosed in the closest prior art references, the fact that the plug 19 tearable at the end of the sleeve 17 is insertable within the same sleeve, has the advantage of allowing removal of the container from the liquid dispenser even when the container is not fully empty. Such a removal may be required for cleaning the dispenser or for any other maintenance necessity. Such has also the advantage of allowing return of the container to the bottler while protecting it against polluting agents, which, as a result, make easier the selection of suitable cleaning detergents.

In addition to the above mentioned advantages, the cap according to the invention has the advantage of having a cylindrical frangible connection 23 of very efficient structure, located between the free edge of the sleeve 27 and the plug. Contrary to the cap disclosed in the international application WO 02/060808 A1, the cap according to the invention also has the advantage of having at least one and preferably two sealing tongues 37 that provides better tightness, less stress and effort to remove the container from the liquid dispenser, and a structural reinforcement that facilitates removal of the cap from the mold by rigidly filing the internal portion of the sleeve.

Moreover, the cap according to the invention may receive an annular sealing joint 16 to improve its tightness, and a seal 14 whose advantages have already been explained hereinabove.

Accordingly, the cap according to the invention provides a high hygienic guarantee since it is made of one single piece from a plastic material that is acceptable for alimentation purpose, within manufacturing places certified for this type of service. The cap according to the invention also permits, thanks to its plug, an obturation of the cap during each removal of the container. Such is particularly important when the container is not fully empty, since this avoids any risk of splash and contamination. When the container is empty, the same security closing permits, during return to the bottler, to use standard cleaning before reuse without having to carry out a particular sorting.

The cap 1 according to the invention can be manufactured by injection within the mold whose structure and operation in several steps and phases, are shown in FIGS. 8 to 15.

Figure 3:
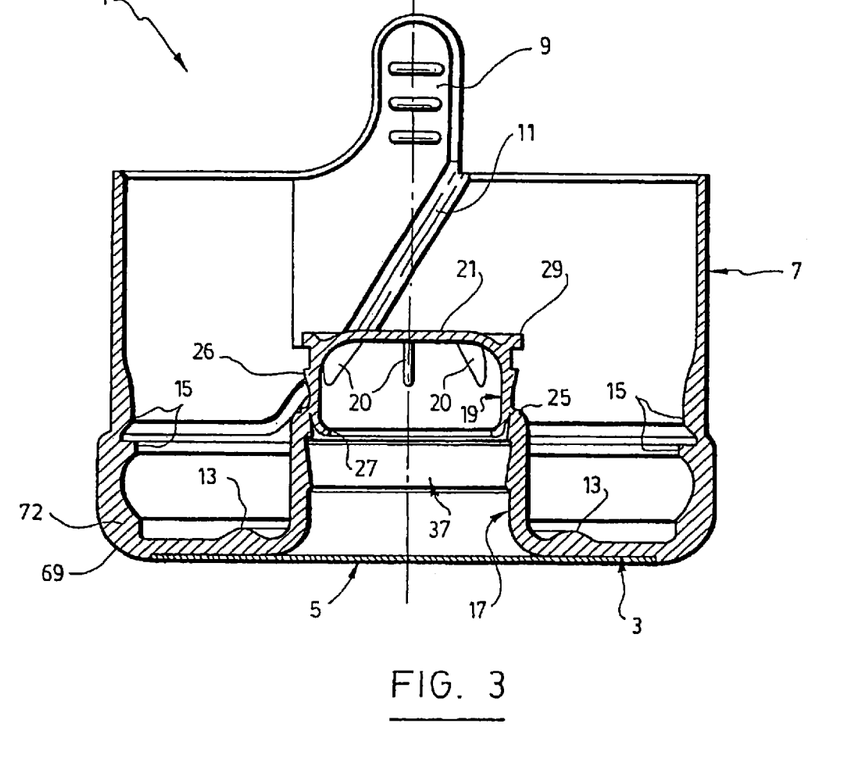
FIG. 3 is a transversal cross-sectional view of the cap shown in FIG. 1.
Figure 8:
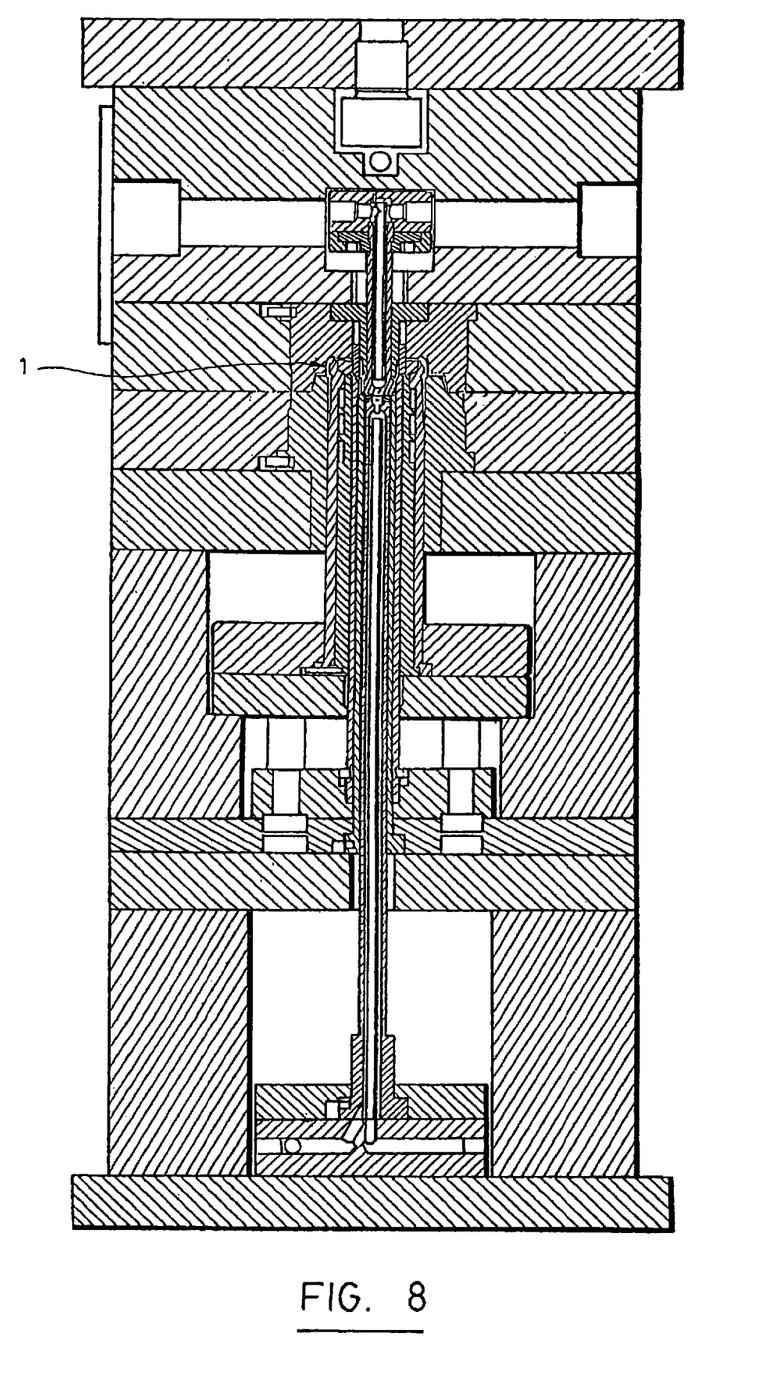
Figure 14A:
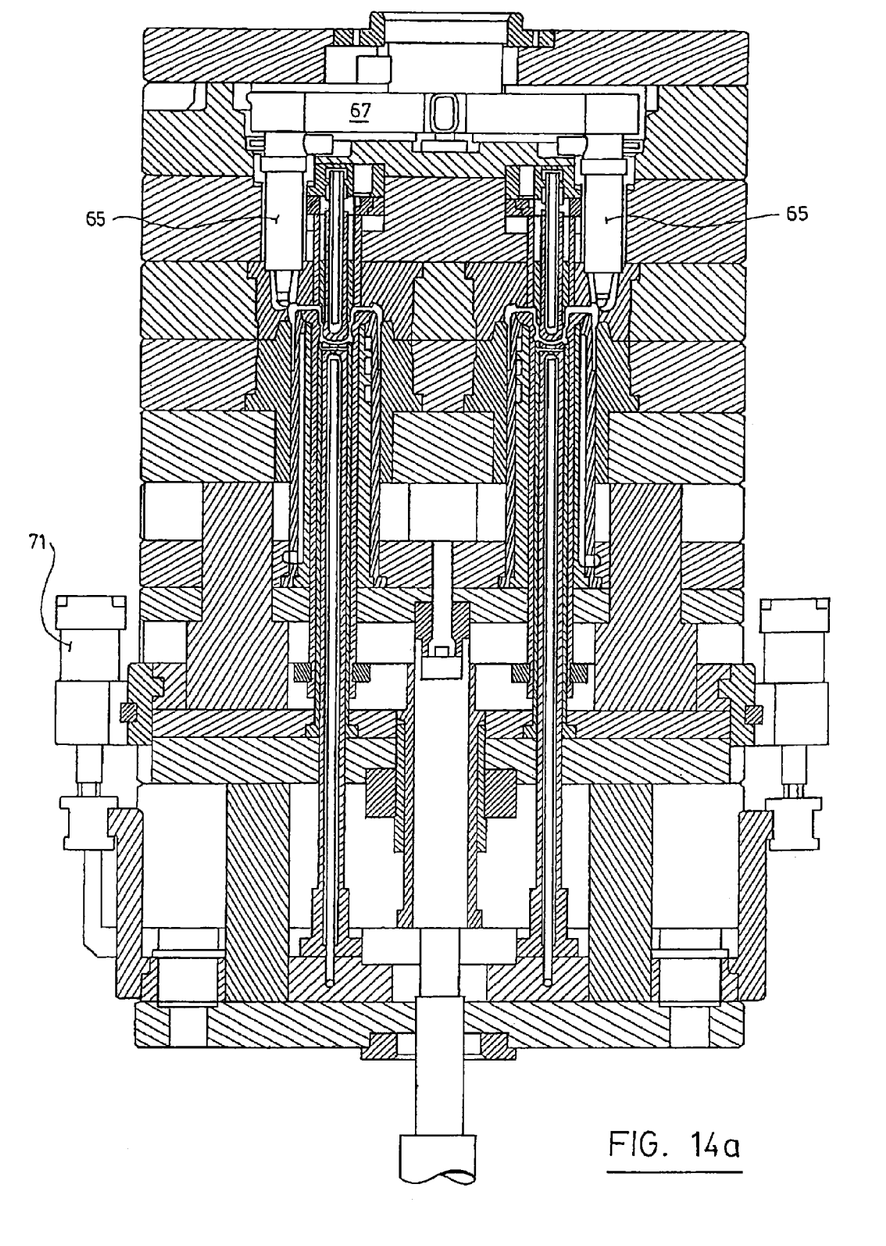
Figure 14B:
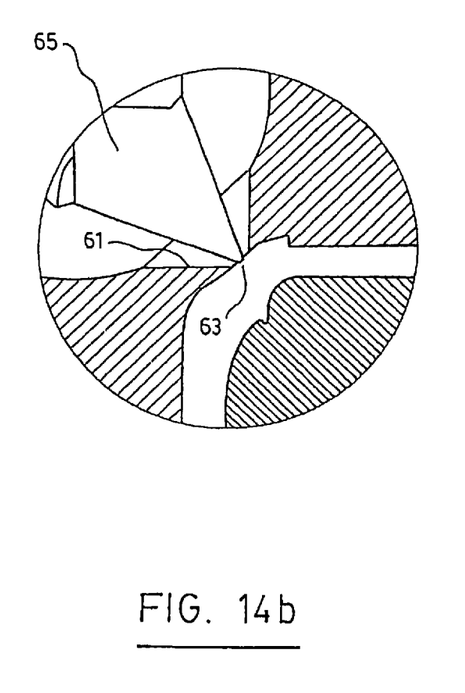

FIG. 8 and the left hand side of FIG. 14 illustrates phase 1, part 1. The mold is then closed. As is better shown in the rounded spot on FIG. 14, the injection of the cap 1 is made in a cavity 61 located on an external periphery 63, via a hot injection nozzle located on one side of the cap and fed by a heated distributor 67. The injection is therefore made laterally at a spot 69 (see FIG. 3) located in a rim 72 formed at the connection between the lid and the skirt of the cap.

Figure 9:
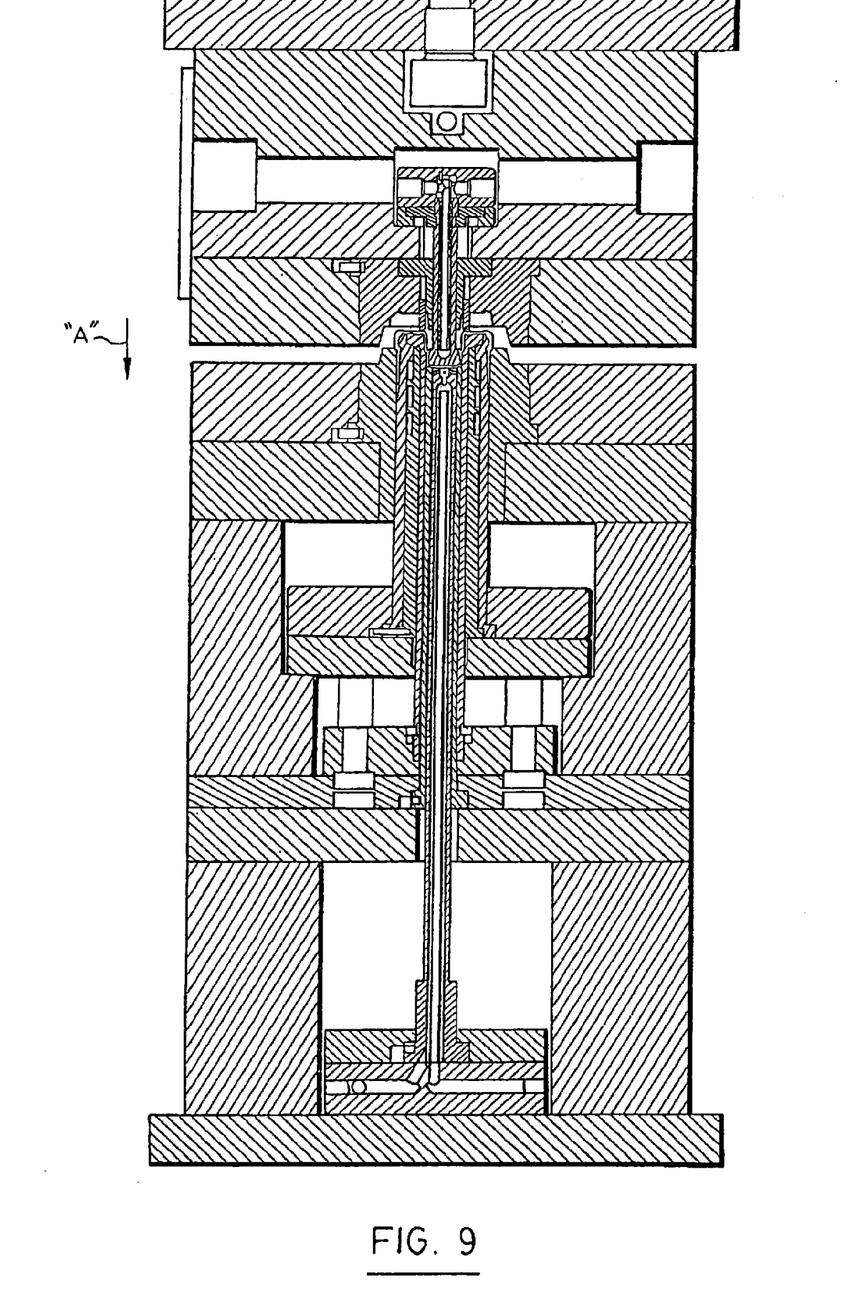
Figure 15:
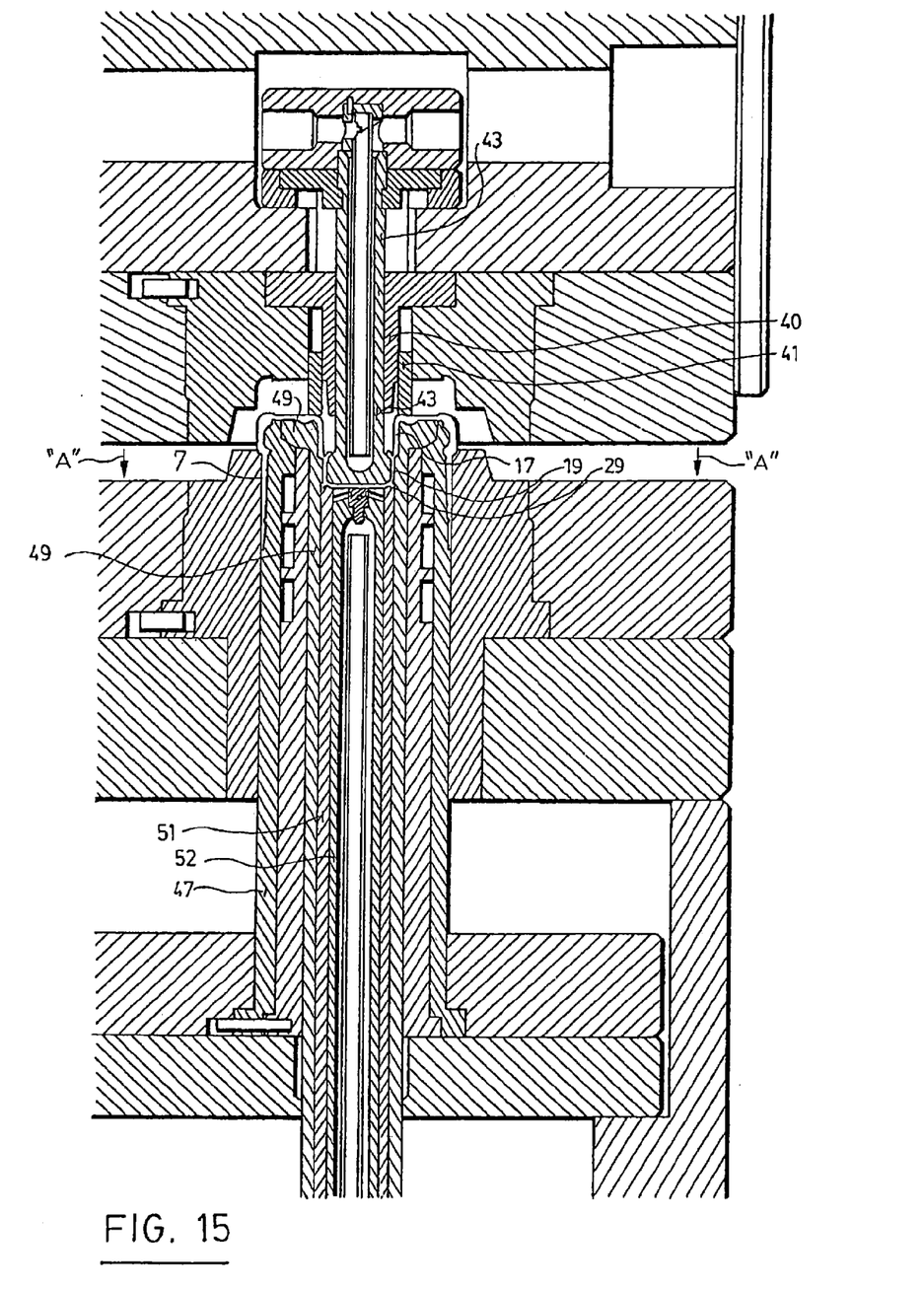
FIG. 15 is a partial view of the mold shown in FIGS. 8 to 15, which has been enlarged to facilitate identification of the most relevant structural elements of said mold.

FIGS. 9 and 15 illustrate phase 1, part 2. In this specific position, the injection mold is in opening phase (see the arrow "A" on FIG. 15). The sleeve 17 of the cap 1 is then extracted from a tubular member 40 by a pushing made by an ejecting ring 41 coaxial to the tubular member 40. During this pushing, a central core 43 mounted within the tubular member 40 and whose lower end is located within the lid of the cap, is moved together with the same. This very specific motion has the advantage of not damaging or deforming the frangible connection between the sleeve and the plug of the cap. It is worth noting that in the production mold, the tubular member 40 is advantageously provided with adjusting means that permit to adjust and optimize the thickness of the frangible connection.

Figure 10:
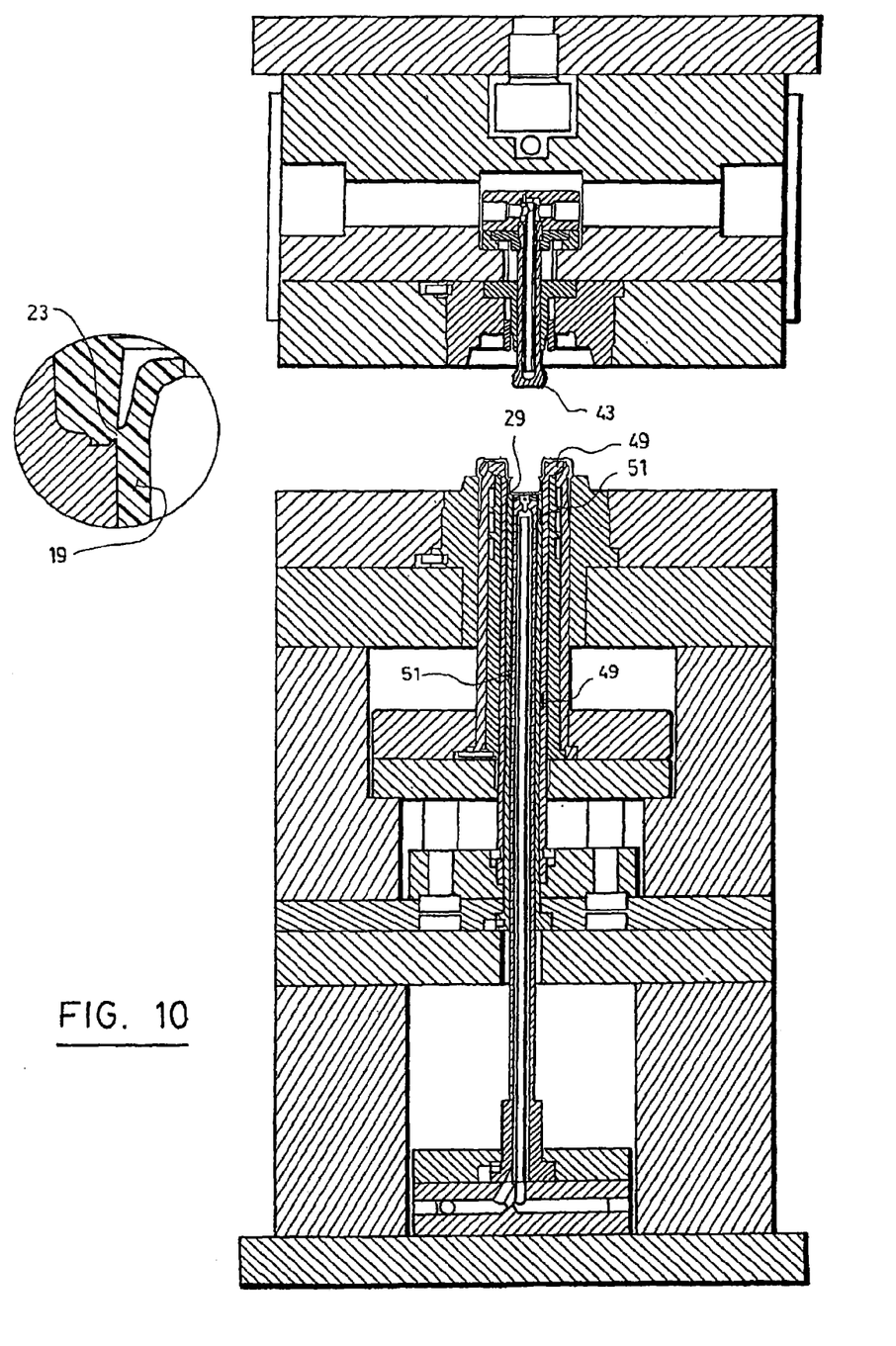

FIG. 10 illustrates phase 1, part 3. This particular step corresponds to the end of the opening of the injection mold. The central core is then extracted from the lid and the sleeve of the cap 1. During this extraction, the lid 17 is retained by its rim 29. In fact, as is shown (see FIG. 15), the rim is then held in between a socket 49 and a tubular member 51 in order to avoid damaging the frangible connection 23.

It is worth mentioning that the motions of phase 1, part 2 and phase 1, part 3 are achieved either by means of mechanical hooks (cylindrical or others) or by means of hydraulic or pneumatic jacks 71 of single or double effects (see FIG. 14).

Figure 11:
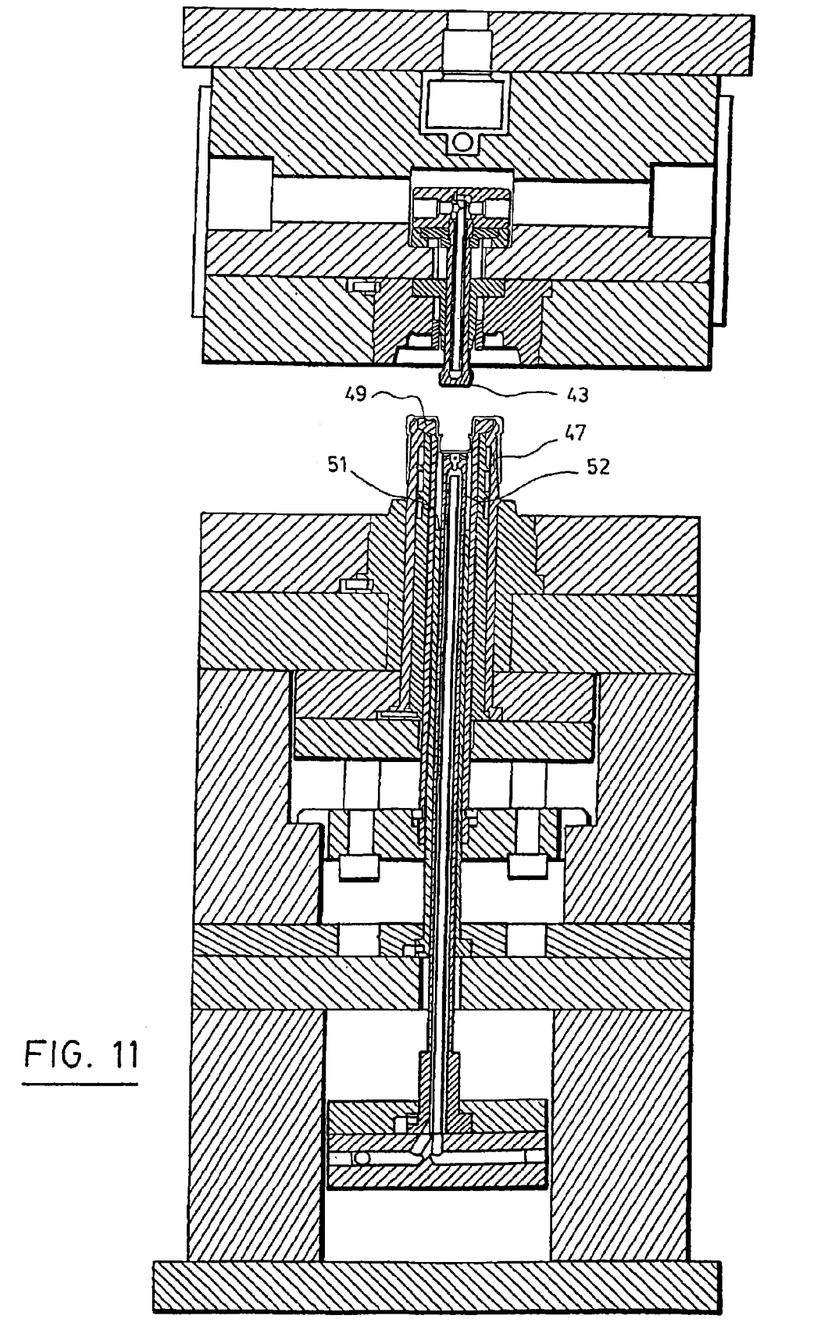

FIG. 11 illustrates phase 2, part 1, wherein the mold cap is extracted from the molding cavity (mobile part of the mold). This extraction is made by a pushing made either by an ejecting machine and a two-times ejection system, or by means of single or double effect hydraulic jacks. This pushing causes a displacement of the core 47, in the middle of which is mounted the socket 49, the tubular member 51 and the central member 52 (see FIG. 15). It is worth noting that the socket 49 and the central member 52 move simultaneously with the core 47. However, the tubular member 51 remains in position and thus liberates the rim 29 of the cap that was, so far, held between the pieces 49 and 51.

Figure 12:
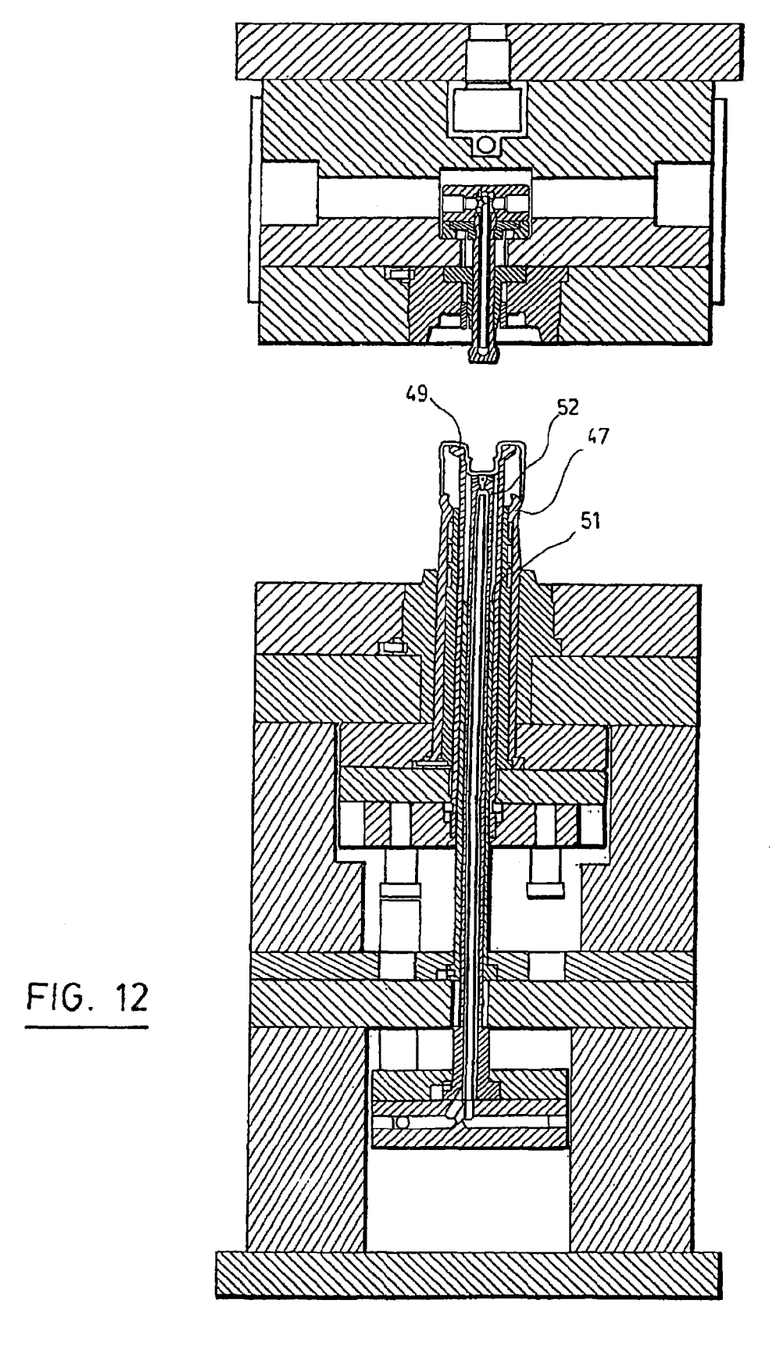

FIG. 12 illustrates phase 2, part 2. During this phase, the cap is extracted from the core 47. Such an extraction is made by means of a pushing made either by the ejecting machine or the ejecting means mounted within the same, or by hydraulic or pneumatic jacks with single of double effect, which move the socket 49 and the central member 52. Simultaneously to this pushing, compressed air is injected within the mold in order to uncompress the cavity and avoid deformation of the molded cap.

Figure 13:
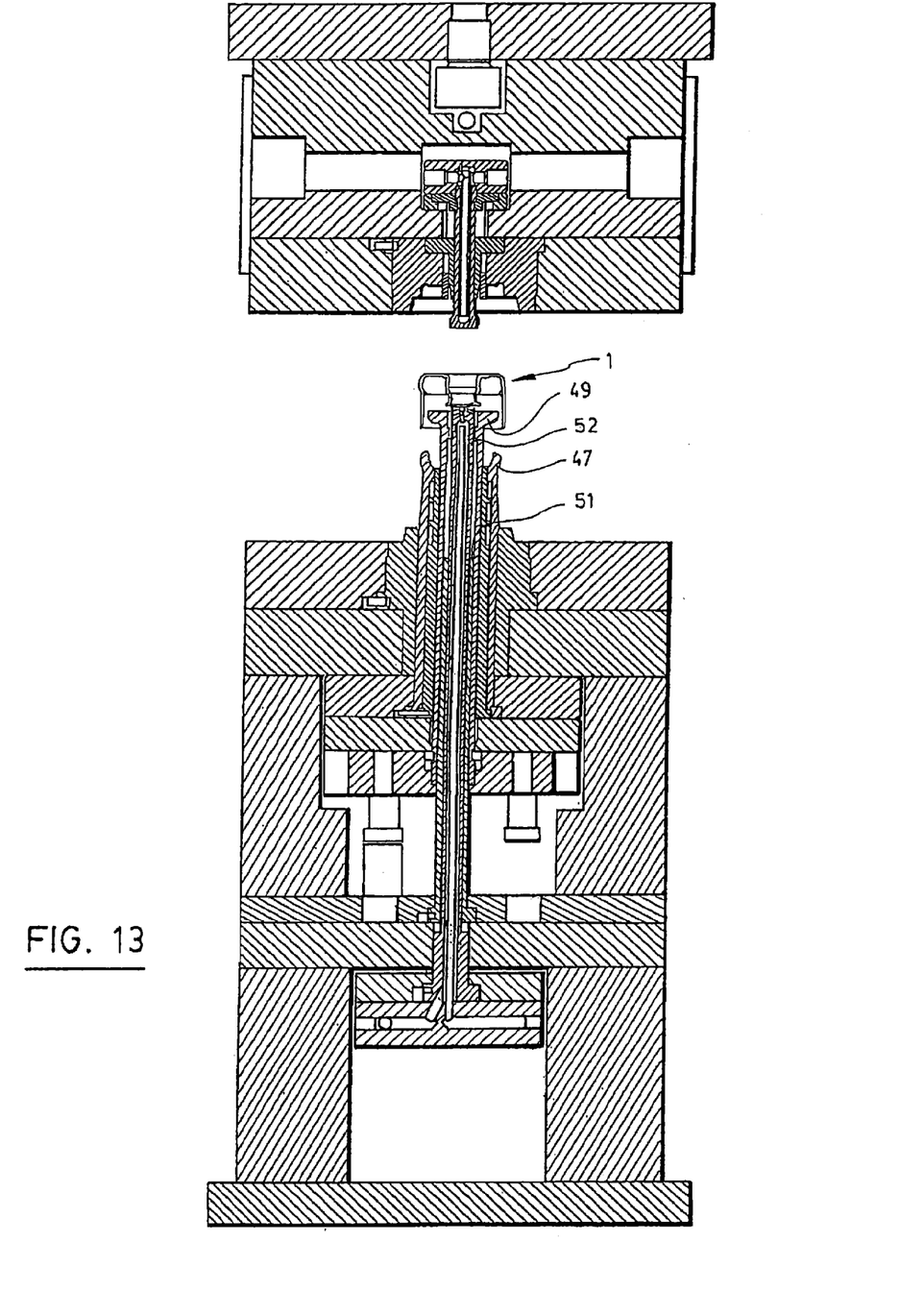

FIG. 13 illustrates phase 2, part 3. This phase comprises a final extraction of the cap. This ejection is made by pushing the central member 52 within the socket 49 by means of pneumatic or hydraulic jacks with single of double effect, as mentioned hereinabove. Such ensures extraction of the whole cap, including our course, its sleeve and block. This final extraction can be completed by a further injection of compressed air, it was already carried out in phase 2, part 2.

FIG. 14 illustrates phase 3, parts 1 and 2. During part 1 of this phase, the jacks having executed phase 2, part 3 are also moved back in original position. Thus, the ejecting jacks are also moved back in their original molding position. During part 2, the two parts of the press are closed and put back in position for a new injection. The molding cycle is then completed.

It is worth noting that contrary to the previous figures, FIG. 14 illustrates a mold provided with two cavities instead of one. This has been done for illustrative purpose, in order to show that, in use, the number of cavities may vary depending on the need and capacity of the mold that is being used.

The method according to the invention as it has been detailed hereinabove may therefore be summarized as follows.

In a first step (phase 1, part 1), a plastic material is injected into a molding cavity in the form of the cap to be molded by means of an injector 65 located laterally with respect to said cavity, the injection being carried out laterally at a point 69 located onto the rim 71 formed by the lid and the annular skirts at their junction.

The molding cavity mentioned above is located in a mold comprising a first part called "fixed part", which is provided with a plurality of axially movable elements including:
   a tubular member 40 having an external periphery acting as an internal molding support for the annular sleeve 17 of the cap;
   an ejecting ring 41 coaxially mounted externally around the tubular member 40, and
   a central core 43 coaxially mounted inside the tubular member 40 and having a lower end acting as an internal molding support for the lid 19.

The mold also comprises a second part hereinafter called "moving part", which is provided with a plurality of other axially movable elements including:
   another core 47 having an external upper periphery acting as an internal molding support for the skirt 7 of the cap;
   a socket 49 coaxially mounted inside the other core 47, the socket having an upper edge and an upper internal periphery acting as an external molding support for the sleeve 17 and the plug 19 of the cap and for one part of the external sealing means (viz. the annular rim 29) of the plug;
   another tubular member 51 coaxially mounted inside the socket 49, said other tubular member having an upper edge acting as a molding support for another part of the external sealing means 29 of the plug; and
   a central member 52 coaxially mounted inside the other tubular member 51, this central member having an upper surface acting as an external molding support for the lid.

The mold further comprises actuating means (71 and others not shown) for separating the fixed and movable parts of the mold and for pushing and pulling the above mentioned movable elements of the fixed and movable parts.

Of course, during this first step of injection, the fixed and movable parts of the mold are in adjacent position for completing and closing the molding cavity.

In a second step (phase 1, part 2), separation of the fixed part and the moving part of the mold is started while holding the central member 40 in original position. Such allows removal of the internal support of the sleeve while allowing the central core 43 to remain within the plug 19 and move therewith.

In a third step (phase 1, part 3), separation of the fixed part and the moving part of the mold is continued in order to obtain extraction of the central core 43 from the plug 19 and the sleeve 17, the cap being then held within the moving part of the mold by means of its external sealing means (viz. its rim 29).

In a fourth step (phase 2, part 1), the other core 47 is actuated simultaneously with the socket 49 and the other tubular member 1 to extract the cap from the moving part of the mold, such an extraction being carried out while maintaining the other tubular member 51 in original position so as to liberate the external sealing means (viz. the rim 29) of the plug from the moving part of the mold.

In a fifth step (phase 2, part 2), the socket 49 and the central member 52 are actuated for extracting the cap from the other core 47, said extraction liberating the skirt 7 of the cap.

In a sixth step (phase 2, part 3), the central member 52 is actuated so as to move it within the socket 49 in order to extract the whole cap.

Last of all, in a seventh and last step, all the movable elements and parts are brought back to their original position to start manufacturing another cap.

The description hereinabove of every phase of operation of the mold for manufacturing the cap by injection in one single piece will allow any one skilled in the art to understand how the inventors have solved the problems mentioned in the prior art, which problems are associated either to manufacturing difficulties resulting in high cost or, more drastically, to the impossibility of carrying out such an injection in one step (see again U.S. Pat. No. 5,392,939 mentioned hereinabove).

The originality of the mold disclosed hereinabove, and of its operation essentially lies in that, since the injection is made laterally on an external radius of the lid of the cap, a motion of the second central core on the fixed part of the mold then becomes possible. In addition, the combination of a double motion of the mold permits to prevent deterioration and deformation of the cap, by overcoming blocking due to counter-stripping.

In other words, a double motion of ejection becomes possible due to the fact that the injection is made in the cavity 61 located on an external periphery 63 (see phase 1, part 1 as shown in FIG. 14). In addition, the use of a tubular member 40 that is adjustable permits to optimize the thickness of the cylindrical frangible connection 23.

In practice, it should noticed that the use of an injection nozzle laterally positioned onto the external periphery of the cap, makes it necessary to provide a rim 13 onto the lid 3 in order to ensure proper equilibrium of the central feed during injection. In the connection zone between the upper part of the cap and the skirt, a spot is provided for an injected sealing joint 16 as was mentioned hereinabove. This sealing joint is a guarantee of tightness, taste and quality of the content of the container.

Of course, numerous other modifications could be made to the obturation cap disclosed hereinabove and shown in the drawings as well as to its method of manufacture, without departing from the scope of the present invention as disclosed hereinabove.

The invention claimed is:

1. In an obturation cap for a liquid container intended to be used in upside down position in a liquid dispenser provided with a feeding system including a feed tube, said cap comprising
   a lid provided with a central opening;
   an annular skirt extending in a given direction all around an external periphery of the lid, said skirt being provided with a central axis and being devised and sized to be connected to the neck of the container; said skirt being provided with an internal surface provided with at least one rim positioned to improve water tightness of the cap once said cap has been mounted onto the neck of the bottle;
   an annular sleeve extending all around the central opening of the lid in the same direction as the skirt and coaxially therewith, the central opening and the sleeve surrounding the same being both sized to receive and guide the feed tube of the liquid dispenser used with the container closed by the cap; and
   a plug fixed in a detachable manner by means of a frangible connection to a free edge of the sleeve opposite to the central opening, said plug being coaxial to the sleeve and devised to be separated from the same when the container closed by the cap is inserted into the liquid dispenser, the frangible connection between the sleeve and the plug being located in an angularly oriented inlet zone made in the free edge of the sleeve for, on one hand, facilitating tearing of the frangible connection during insertion of the cap onto the feed tube of the liquid dispenser and, on the other hand, facilitating engagement of the plug within the sleeve during extraction from the feed tube, the plug then acting as an obturator, said plug being also provided with internal gripping means for fixing it temporarily to an upper end of the feed tube during water flow, and with external sealing means for closing the sleeve when the container is removed from the liquid dispenser, the plug being then pulled back to the sleeve and forced into the same by the feed tube while the same is extracted from the sleeve,
   wherein said sleeve further comprises a plurality of sealing tongues provided on an inner surface thereof, for aligning the plug within the sleeve during extraction from the feed tube,
   wherein the plug comprises at least one wing protruding from an end wall of the plug, and being spaced from an inner sidewall of the plug for centering the feed tube when the feed tube is inserted in the plug.

2. The cap according to claim 1, wherein the at least one wing comprises a plurality of wings which are spaced around the central axis.

3. In an obturation cap for a liquid container intended to be used in upside down position in a liquid dispenser provided with a feeding system including a feed tube, said cap comprising
   a lid provided with a central opening;
   an annular skirt extending in a given direction all around an external periphery of the lid, said skirt being provided with a central axis and being devised and sized to be connected to the neck of the container; said skirt being provided with internal surface provided with at least one rim positioned to improve water tightness of the cap once said cap has been mounted onto the neck of the bottle;
   an annular sleeve extending all around the central opening of the lid in the same direction as the skirt and coaxially therewith, the central opening and the sleeve surrounding the same being both sized to receive and guide the feed tube of the liquid dispenser used with the container closed by the cap; and
   a plug fixed in a detachable manner by means of a frangible connection to a free edge of the sleeve opposite to the central opening, said plug being coaxial to the sleeve and devised to be separated from the same when the container closed by the cap is inserted into the liquid dispenser, the frangible connection between the sleeve and the plug being located in an angularly oriented inlet zone made in the free edge of the sleeve for, on one hand, facilitating tearing of the frangible connection during insertion of the cap onto the feed tube of the liquid dispenser and, on the other hand, facilitating engagement of the plug within the sleeve during extraction from the feed tube, the plug then acting as an obturator, said plug being also provided with internal gripping means for fixing it temporarily to an upper end of the feed tube during water flow, and with external sealing means for closing the sleeve when the container is removed from the liquid dispenser, the plug being then pulled back to the sleeve and forced into the same by the feed tube while the same is extracted from the sleeve,
   wherein the angularly oriented inlet zone comprises a portion above the frangible connection being inwardly oriented and a portion below the frangible connection being inwardly oriented, the inclination angle of the portion above the frangible connection being larger than the inclination angle of the portion below the frangible connection.

4. The cap according to claim 3, wherein the portion below the frangible connection having an inwardly oriented inclination angle ranging from 5° to 20°.

* * * * *